United States Patent
Tseng

(10) Patent No.: US 9,333,854 B2
(45) Date of Patent: May 10, 2016

(54) VEHICLE TRANSMISSION DEVICE

(71) Applicant: Sheng-Tsai Tseng, Taoyuan County (TW)

(72) Inventor: Sheng-Tsai Tseng, Taoyuan County (TW)

( * ) Notice: Subject to any disclaimer, the term of this patent is extended or adjusted under 35 U.S.C. 154(b) by 0 days.

(21) Appl. No.: 14/582,389

(22) Filed: Dec. 24, 2014

(65) Prior Publication Data

US 2015/0192191 A1 Jul. 9, 2015

(30) Foreign Application Priority Data

Jan. 3, 2014 (TW) .............................. 103100217 A

(51) Int. Cl.
| | |
|---|---|
| *B60K 17/08* | (2006.01) |
| *F16H 3/089* | (2006.01) |
| *F16H 3/10* | (2006.01) |
| *F16H 3/38* | (2006.01) |
| *F16H 13/04* | (2006.01) |

(52) U.S. Cl.
CPC ................ *B60K 17/08* (2013.01); *F16H 3/089* (2013.01); *F16H 3/10* (2013.01); *F16H 2200/0039* (2013.01); *Y10T 74/1926* (2015.01); *Y10T 74/19251* (2015.01)

(58) Field of Classification Search
CPC ............... F16H 3/38; F16H 3/36; F16H 3/34; F16H 3/32; F16H 37/046; F16H 3/089; F16H 3/091; F16H 3/10; F16H 61/0293; F16H 3/08; F16H 63/30; F16H 2063/3093

USPC ........ 74/336 R, 333, 359, 325, 330; 475/198, 475/199, 206; 192/35, 48.92
See application file for complete search history.

(56) References Cited

U.S. PATENT DOCUMENTS

| 1,666,766 | A | * | 4/1928 | Alspaugh | ............... | B60K 17/08 192/48.3 |
|---|---|---|---|---|---|---|
| 5,000,057 | A | * | 3/1991 | Tseng | ..................... | F16D 13/08 192/48.92 |
| 5,341,698 | A | * | 8/1994 | Tseng | ....................... | F16H 3/10 192/35 |
| 5,421,784 | A | * | 6/1995 | Robert | .................. | F16H 55/563 474/13 |
| 5,437,205 | A | * | 8/1995 | Tseng | ..................... | F16D 13/08 192/41 S |
| 6,146,306 | A | * | 11/2000 | Tseng | ................... | F16H 37/046 192/48.92 |
| 2015/0192191 | A1 | * | 7/2015 | Tseng | .................... | B60K 17/08 74/336 R |

* cited by examiner

*Primary Examiner* — Ha D Ho
*Assistant Examiner* — Jude Agendia
(74) *Attorney, Agent, or Firm* — Rosenberg, Klein & Lee

(57) ABSTRACT

A vehicle transmission device provides power transmission and speed switch for the operation demands of the vehicle to advance. The transmission device includes a driving shaft or an input shaft connected with a power source. The input shaft is provided with an input gear set and spring-like members disposed inside the input gear set. An output gear set is provided to mesh with the input gear set. A transmission control mechanism is disposed on the input shaft for the input gear set to transmit a power to the output gear set and an output shaft to output the power to drive the vehicle. The present invention can enhance the power, torsion and speed of the vehicle.

15 Claims, 5 Drawing Sheets

VEHICLE TRANSMISSION DEVICE

BACKGROUND OF THE INVENTION

1. Field of the Invention

The present invention relates to a vehicle transmission device, and more particularly to a power transmission device applied to a vehicle, cooperating with a transmission control to output the power.

2. Description of the Related Art

A conventional transmission device, a gear set and a differential mechanism are applied to a vehicle or an electric vehicle to transmit power and advance or reverse or idle the vehicle. For example, U.S. Pat. No. 6,146,306 discloses an automobile transmission device.

The existent vehicle transmission systems include a manual transmission system, an automatic transmission system and a continuous transmission system. The power of the a rotary shaft of the engine or motor is transmitted to an output shaft via a transmission control mechanism, an input gear set mounted on an input shaft, a (bevel gear) differential mechanism disposed on an output shaft and an output gear set. Accordingly, the vehicle can be driven by different transmission ratios. Basically, the transmission control mechanism includes multiple spring-like members and control push sleeves respectively mounted inside and outside the input gear set. A manual or an automatic transmission control motor is used to control a turbine disc to rotate so as to selectively drive different balls (or push rods) to push the control push sleeves for engaging the spring-like bodies with the input gear set or disengaging the spring-like members from the input gear set. Accordingly, the input gear set with different tooth numbers respectively drives the output gear set and the differential mechanism, whereby the output shaft can drive the vehicle by different rotational speeds.

A conventional transmission shaft is provided with a deceleration gear set and a synchronizer to operate the power transmission to generate a speed change of a first shift or a second shift.

In the prior art, a transmission shaft and a gear set are applied to cooperate with a friction-type high-speed transmission set, and a turning disc is turned to generate a centrifugal force, such that the parts of the turning disc brings a casing to move.

A topic is about the structural design, operation and application of the vehicle speed change and transmission device. In the prior art, a motor is used to bring the vehicular structure to generate enough power and torsion, which has some shortcomings. It is large in size, and the speed cannot be enhanced. Some small vehicles or electric vehicles are not provided with a transmission device in order to reduce the size of the motor. This may influence the torsion and speed output. This situation is not expected.

The above power transmission device and the cooperative structures thereof can be redesigned and simplified to be different from the conventional technique and more direct and simpler than the conventional technique in operation and power transmission. In this case the power transmission mode is changed and distinguishable from the conventional technique.

SUMMARY OF THE INVENTION

The primary object of the present invention to provide a vehicle transmission device which provides power transmission and speed switch for the operation demands of the vehicle to advance. The transmission device includes a driving shaft or an input shaft connected with a power source. The input shaft is provided with an input gear set and spring-like members disposed inside the input gear set. An output gear set is provided to mesh with the input gear set. A transmission control mechanism is disposed on the input shaft for the input gear set to transmit a power to the output gear set and an output shaft to output the power to drive the vehicle. The present invention can enhance the power, torsion and speed of the vehicle.

Preferably, the spring-like members are connected with the transmission sleeves and the controllers. The controllers each have a push sleeve and a thrust bearing and are movable a first position and a second position. The controllers control the turning power of the input shaft to be transmitted to the spring-like members through the transmission sleeves to drive the input gear set to turn the output gear set and the output shaft or to idle the spring-like members.

Preferably, the transmission control mechanism includes a transmission control disc, a turning disc, and a restoring spring disposed between the transmission control disc and the turning disc. The transmission control disc is controlled by a manual operation mode or cooperates with a (automobile) transmission control motor according to the detection of the rotational speed of the input shaft to control the transmission control disc to turn the turning disc, enabling the push sleeves and the thrust bearings to push or not to push the spring-like members so as to control the power transmission mode of the input shaft, the input gear set, and the output gear set.

DETAILED DESCRIPTION OF THE PREFERRED EMBODIMENTS

Embodiments of the present invention will now be described, by way of example only, with reference to the accompanying drawings.

Figure 1:
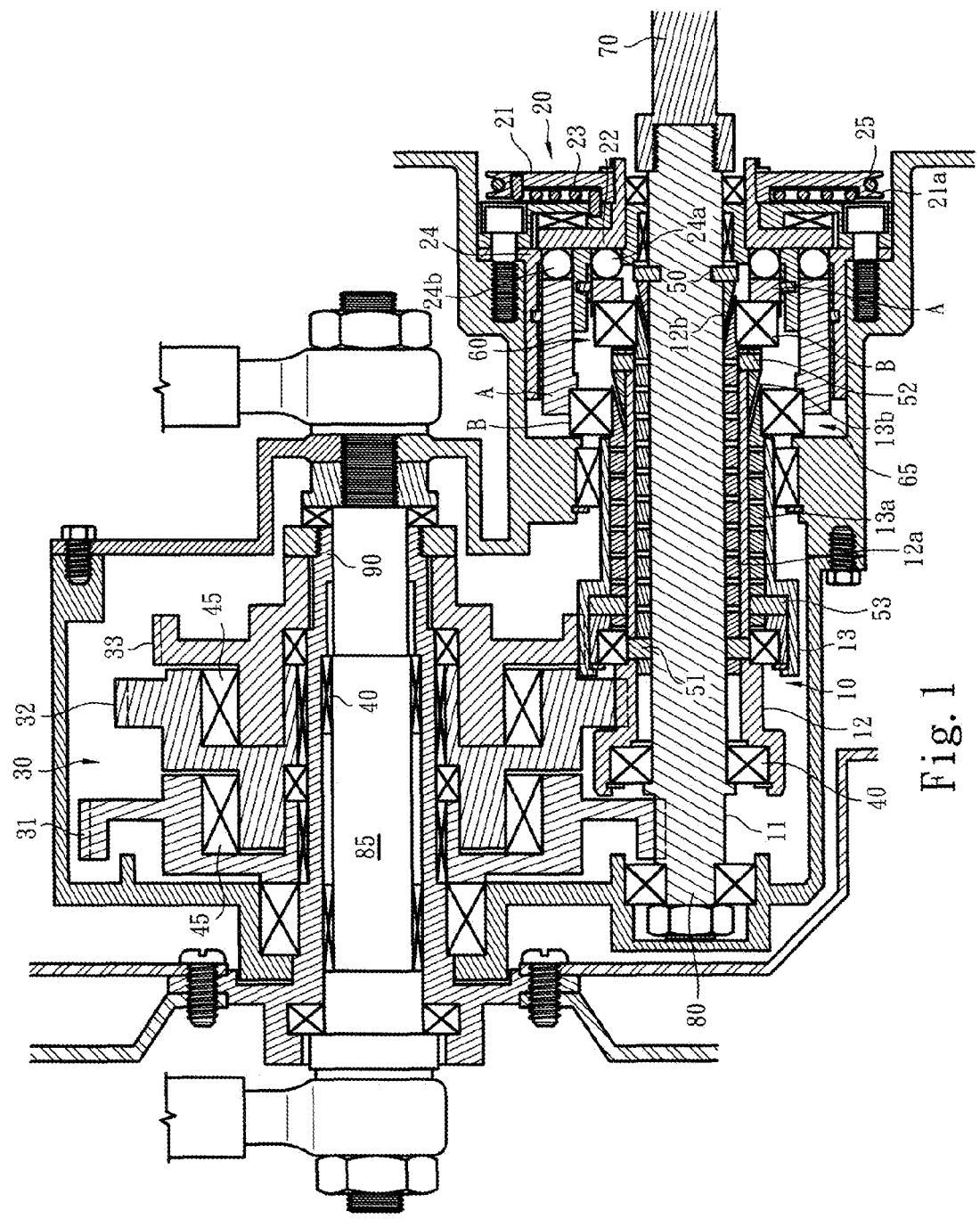
FIG. 1 is a sectional view according to a preferred embodiment of the present invention, showing the transmission control mechanism located at the first shift position and the cooperation of the controllers, the spring-like members and the transmission sleeves.

Referring to FIG. 1, the vehicle transmission device of the present invention is applied to an automobile, an electric mobile, a motorcycle, an electric motorcycle, and so on. The vehicle transmission device comprises a driving shaft or an input shaft 80 connected with a power source 70. The power source 70 is selective from one of a motor, an internal combustion engine, and an engine to provide rotational power for the input shaft 80.

In an embodiment, the input shaft 80 is provided with an input gear set 10 and a transmission control mechanism 20. As shown in the drawings, the input gear set 10 is selectively a three-gear or four-gear transmission system. Therefore, the input gear set 10 includes a first input gear 11, a second input gear 12, and a third input gear 13. The first input gear 11 is directly disposed or fixed on the input shaft 80. Therefore, the first input gear 11 is synchronously turned along with the input shaft 80. The second and third input gears 12, 13 cooperating with a bearing 40 are mounted on the input shaft 80. Spring-like members 12a, 13a and transmission sleeves 12b, 13b are provided inside the second and third input gears 12, 13.

As shown in the drawings, the spring-like member 12a is disposed around the input shaft 80. The transmission sleeve 12b cooperating with a retainer 50 (such as, a pin, a button or the like) is fixed on the input shaft 80, such that the transmission sleeve 12b and the input shaft 80 are turned synchronously. The spring-like member 12a has two ends. One end of the spring-like member 12a is to connect with or disconnect from the transmission sleeve 12b, and another end of the spring-like member 12a cooperating with a retainer 51 is fixed on the second input gear 12, such that the spring-like member 12a and the second input gear 12 are turned synchronously.

As shown in FIG. 1, the spring-like member 13a is disposed around the second input gear 12, and the transmission sleeve 13b cooperating with a retainer 52 is fixed on the second input gear 12, such that the transmission sleeve 13b and the second input gear 12 are turned synchronously. The spring-like member 13a has two ends. One end of the spring-like member 13a is to connect with or disconnect from the transmission sleeve 13b, and another end of the spring-like member 13a cooperating with a retainer 53 is fixed on the third input gear 13, such that the spring-like member 13a and the third input gear 13 are turned synchronously.

In the preferred embodiment, the transmission control mechanism 20 on the input shaft 80 includes a rotatable transmission control disc 21, a turning disc 22 which is turned along with the transmission control disc 21, and a restoring spring 23 disposed between the transmission control disc 21 and the turning disc 22. The restoring spring 23 has two ends fixed on the transmission control disc 21 and the turning disc 22, respectively.

As shown in the drawings, the transmission control mechanism 20 further comprises a ball disc or a ball cylinder 24. The ball cylinder 24 is adapted to accommodate steel balls or balls 24a, 24b for the balls 24a, 24b to move inside the ball cylinder 24. In this embodiment, the balls 24a are defined as inner balls, and the balls 24b are defined as outer balls.

It is understood that the transmission control disc 21 is controlled by a manual operation mode or cooperates with a (automobile) transmission control motor according to the detection of the rotational speed of the input shaft 80 to bring the turning disc 22 to turn. This embodiment adopts the manual operation mode. The periphery of the transmission control disc 21 is formed with a groove 21a to retain a steel cable or rope 25. When the rope 25 is pulled by the operator, the transmission control disc 21 and the turning disc 22 are turned to change the rotational speed of the input shaft 80. This will be described hereinafter.

In the preferred embodiment, controllers 60, 65 are provided between the spring-like members 12a, 13b and the transmission control mechanism 20. The controller 60 is defined as an inner controller, and the controller 65 is defined as an outer controller.

Furthermore, the inner and outer controllers 60, 65 each have a push sleeve A and a (thrust) bearing B. One end of the push sleeve A of the inner controller 60 is in contact with the inner balls 24a, another end of the push sleeve A of the inner controller 60 is connected with the bearing B, and the bearing B is connected with the spring-like spring 12a. One end of the push sleeve A of the outer controller 65 is in contact with the outer balls 24b, another end of the push sleeve A of the outer controller 65 is connected with the bearing B, and the bearing B is connected with the spring-like spring 13a. The inner and outer controllers 60, 65 are movable between a first position and a second position for the push sleeves A and the bearings B to push or not to push the spring-like members 12a, 13a so as to control the power transmission mode of the input shaft 80 and the input gear set 10.

In the preferred embodiment, the vehicle transmission device further comprises a stationary main shaft 85 and a rotatable output shaft 90. The main shaft 85 is adapted for installation of wheels (not shown in the drawings). The output shaft 90 cooperating with the bearing 40 is mounted on the main shaft 85 for driving the wheels with the main shaft 85 as a fulcrum to turn.

The output shaft 90 is provided with an output gear set 30 corresponding to the input gear set 10. The output gear set 30 is also selectively a three-gear or four-gear transmission system. Therefore, the output gear set 30 includes a first output gear 31, a second output gear 32, and a third output gear 33, which are freely rotatable. The first, second and third output gears 31, 32, 33 are engaged with the first, second and third input gears 11, 12, 13, respectively. A one-way bearing 45 is provided between the first and second output gears 31, 32, and another one-way bearing 45 is provided between the second and third output gears 32, 33. Thereby, the first, second and third output gears 31, 32, 33 allows that only a lower-rank output gear can drive a higher-rank output gear, while a higher-rank output gear cannot drive a lower-rank output gear. For example, the first output gear 31 can drive the second and third output gears 32, 33 and the output shaft 90; the second output gear 32 can drive the third output gear 33 and the output shaft 90; it is impossible for the third output gear 33 to drive the second output gear 32 or the first output gear 31.

In the preferred embodiment, the third output gear 33 is fixed on the output shaft 90. Thus, the third output gear 33 and the output shaft 90 are turned synchronously.

Figure 2:
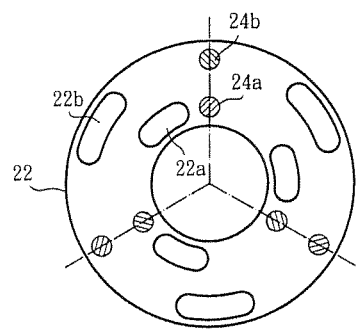
FIG. 2 is a schematic view of the transmission control mechanism located at the first shift position, depicting the relative position of the turning disc and the balls.

FIG. 2 shows the cooperation of the plane structure of the turning disc 22 and the balls 24a, 24b. The turning disc 22 is formed with inner grooves 22a and outer grooves 22b which are arranged in the direction from the center to the periphery of the turning disc 22, corresponding to the inner balls 24a and the outer balls 24b. Partial portions of the inner grooves 22a and the outer grooves 22b are located at the same straight line. For example, as shown in the drawings, left portions of the inner grooves 22a and right portions of the outer grooves 22b are located at the same straight line.

In the preferred embodiment, the turning disc 22 is formed with three sets of inner and outer grooves 22a, 22b which are spaced at an angle of 120 degrees. The ball cylinder 24 is provided with three sets of balls 24a, 24b corresponding to the inner and outer grooves 22a, 22b of the turning disc 22.

Figure 3:
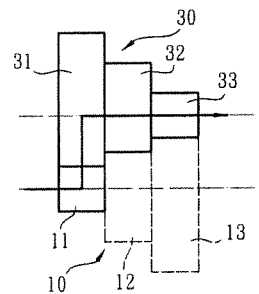
FIG. 3 is a schematic view showing the power transmission of the transmission control mechanism located at the first shift position.

As shown in FIG. 1, FIG. 2 and FIG. 3, the transmission control mechanism 20 is located at the first speed position or the first shift position. FIG. 1 and FIG. 2 show the inner and outer balls 24a, 24b located on the turning disc 22, rendering the push sleeves A and the bearings B of the inner and outer controllers 60, 65 to push the spring-like members 12a, 13a to move toward the left of FIG. 1 so as to depart from the transmission sleeves 12b, 13b. At this time, the position of the push sleeves A and the bearings B of the inner and outer controllers 60, 65 is defined as the first position.

Therefore, the turning power of the input shaft 80 is unable to respectively bring the spring-like members 12a, 13a through the transmission sleeves 12b, 13b to drive the second and third input gears 12, 13, only through the first input gear 11 disposed on the input shaft 80 to bring the first output gear 31 to turn. The first output gear 31 cooperates with the one-way bearing 45 to bring the second and third output gears 32, 33 and the output shaft 90 to turn at the same speed of the first output gear 31. As shown in FIG. 3, the speed of the output shaft 90 to drive the wheels is defined as the first speed or the first shift.

Figure 5:
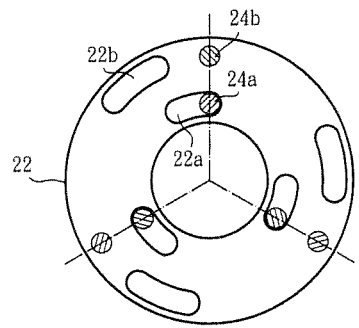
FIG. 5 is a schematic view of the transmission control mechanism located at the second shift position, depicting the relative position of the turning disc and the balls.
Figure 6:
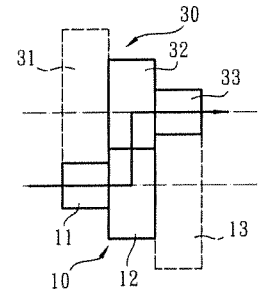
FIG. 6 is a schematic view showing the power transmission of the transmission control mechanism located at the second shift position.
Figure 4:
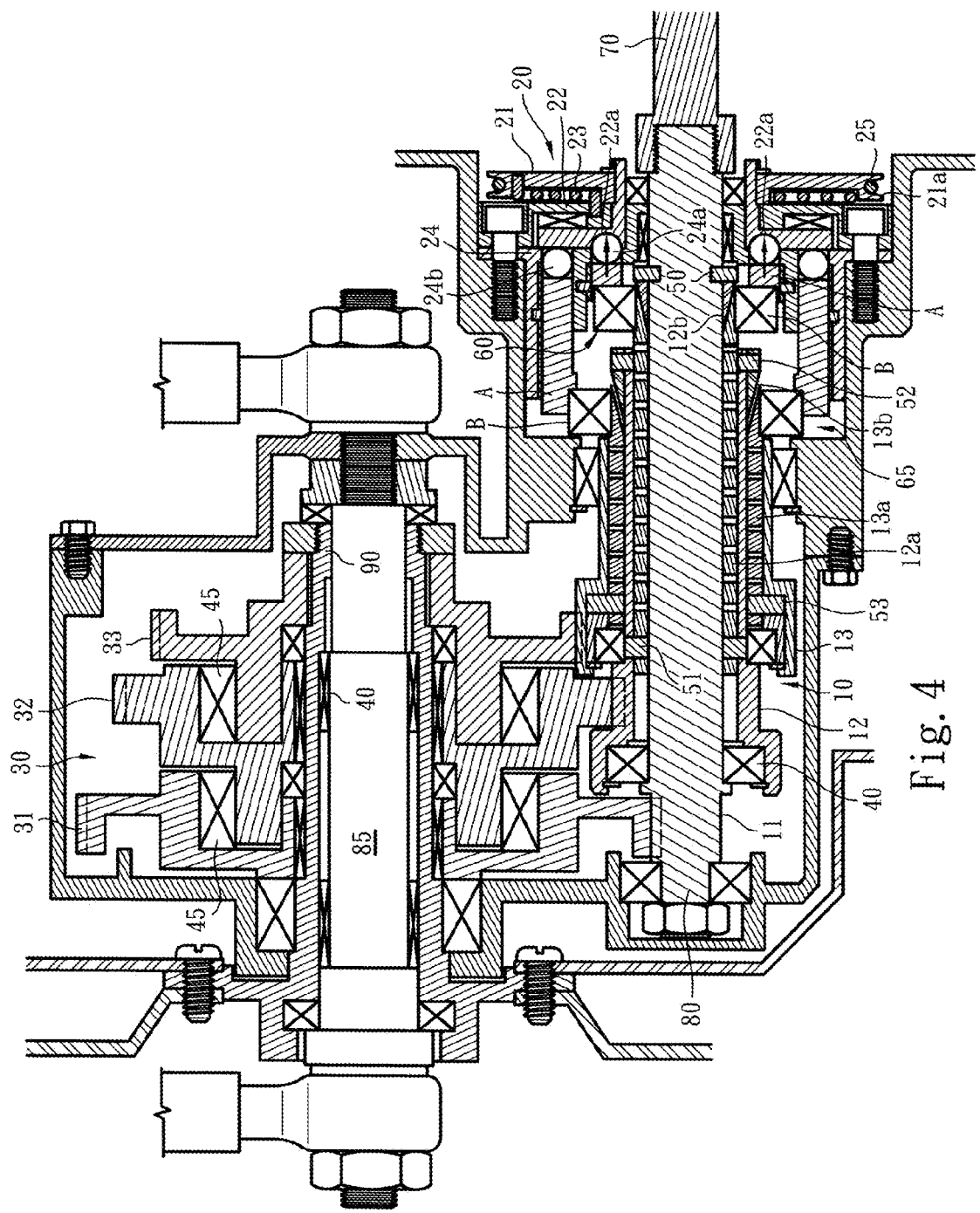
FIG. 4 is another sectional view of the present invention, showing the transmission control mechanism located at the second shift position and the cooperation of the controllers, the spring-like members and the transmission sleeves.

As shown in FIG. 4, FIG. 5 and FIG. 6, the transmission control mechanism 20 is located at the second speed position or the second shift position. When the rotational speed of the input shaft 80 driven by the power source 70 is increased, the operator can operate the rope 25 to drive the transmission control disc 21 to turn the turning disc 22 an angle (as shown in FIG. 5, the turning disc 22 is turned clockwise). At this time, the inner grooves 22a reach the position of the inner balls 24a, so that the inner balls 24a are in the inner grooves 22a, allowing the push sleeve A and the bearing B of the inner controller 60 to move from the first position toward the right of FIG. 4, such that the spring-like member 12a is restored to get contact with the transmission sleeve 12b.

At this time, the position of the push sleeve A and the bearing B of the inner controller 60 is defined as the second position. As shown in the drawings, the position of the push sleeve A and the bearing B of the outer controller 65 is still located at the first position, such that the spring-like member 13a and the transmission sleeve 13b are still in a separate state.

Therefore, the turning power of the input shaft 80 brings the spring-like member 12a and the second input gear 12 through the transmission sleeve 12b to drive the second input gear 32 to turn. The second output gear 32 cooperates with the one-way bearing 45 to bring the third output gear 33 and the output shaft 90 to turn at the same speed of the second output gear 32. As shown in FIG. 6, the speed of the output shaft 90 to drive the wheels is defined as the second speed or the second shift.

Figure 7:
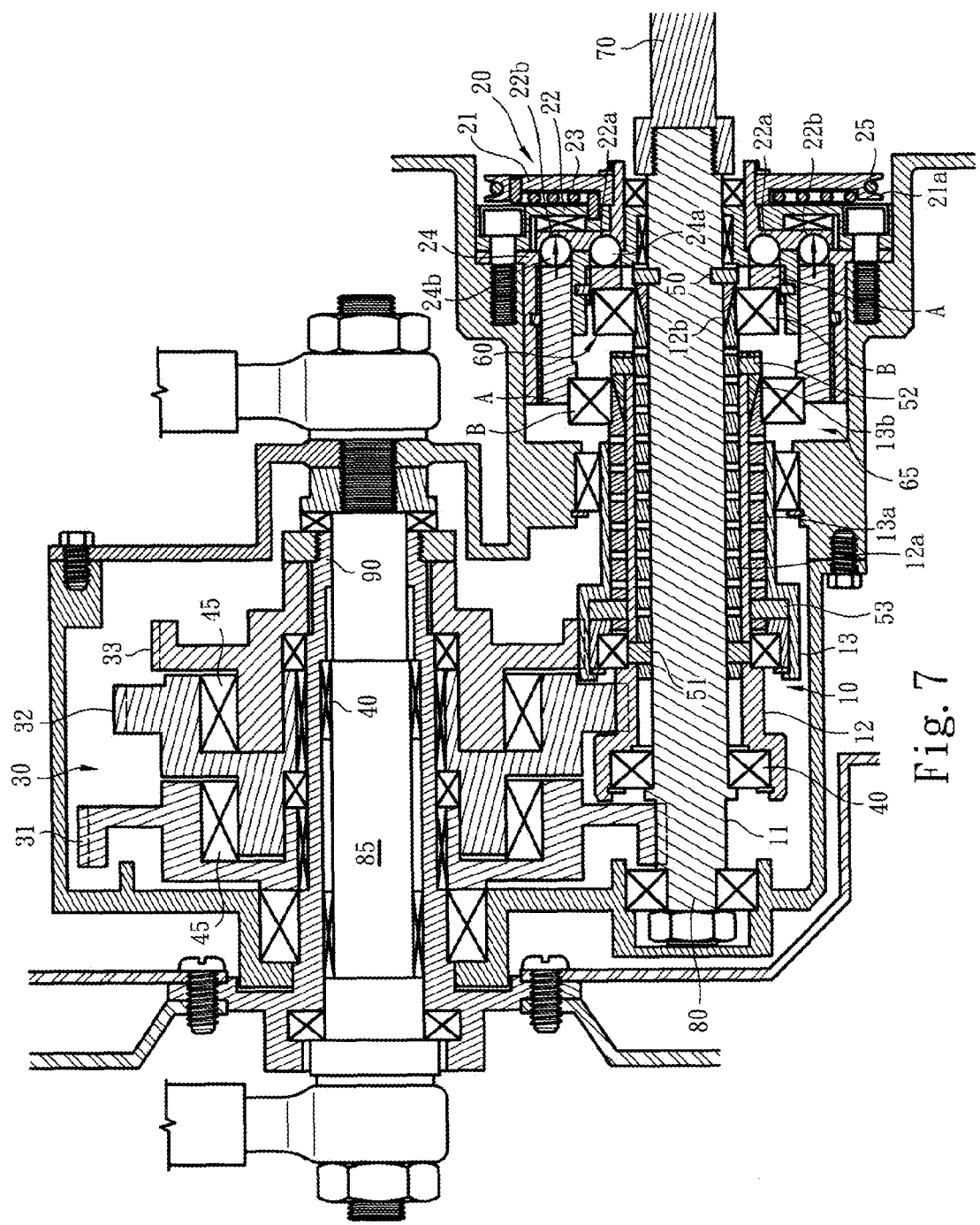
FIG. 7 is a further sectional view of the present invention, showing the transmission control mechanism located at the third shift position and the cooperation of the controllers, the spring-like members and the transmission sleeves.
Figure 8:
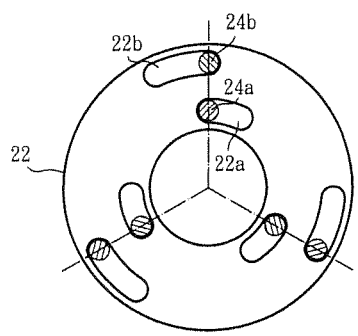
FIG. 8 is a schematic view of the transmission control mechanism located at the third shift position, depicting the relative position of the turning disc and the balls.
Figure 9:
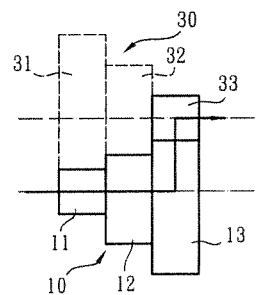
FIG. 9 is a schematic view showing the power transmission of the transmission control mechanism located at the third shift position.

As shown in FIG. 7, FIG. 8 and FIG. 9, the transmission control mechanism 20 is located at the third speed position or the third shift position. When the rotational speed of the input shaft 80 driven by the power source 70 is further increased, the operator can operate the rope 25 to drive the transmission control disc 21 to turn the turning disc 22 an angle (as shown in FIG. 8, the turning disc 22 is turned clockwise). At this time, the inner balls 24a are still located in the inner grooves 22a. The outer grooves 22b reach the position of the outer balls 24b for the outer balls 24b to be in the outer grooves 22b, allowing the push sleeve A and the bearing B of the outer controller 65 to move from the first position toward the right of FIG. 7, such that the spring-like member 13a is restored to get contact with the transmission sleeve 13b.

At this time, the position of the push sleeve A and the bearing B of the outer controller 65 is defined as the second position. As shown in the drawings, the position of the push sleeve A and the bearing B of the inner controller 60 is still located at the second position, such that the spring-like member 12a and the transmission sleeve 12b are still in a contact state.

Therefore, the turning power of the input shaft 80 brings the spring-like member 12a and the second input gear 12 to turn through the transmission sleeve 12b, and the transmission sleeve 13b brings the third input gear 13 to drive the third output gear 33 to turn. As shown in FIG. 9, the speed of the output shaft 90 to drive the wheels is defined as the third speed or the third shift.

Figure 10:
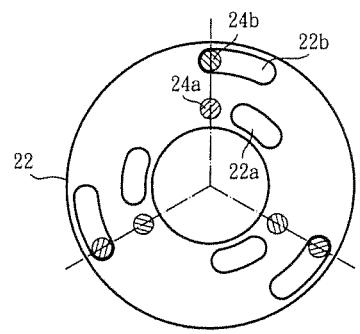
FIG. 10 is a schematic view of the transmission control mechanism located at the fourth shift position, depicting the relative position of the turning disc and the balls.
Figure 11:
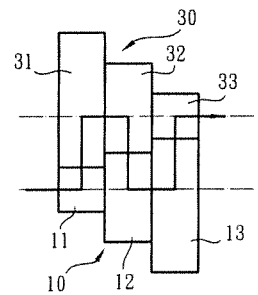
FIG. 11 is a schematic view showing the power transmission of the transmission control mechanism located at the fourth shift position.

As shown in FIG. 10 and FIG. 11, the transmission control mechanism 20 is located at the fourth speed position or the fourth shift position. When the turning disc 22 is further turned an angle, the inner balls 24a depart from the inner grooves 22a to be located on the turning disc 22. The push sleeve A and the bearing B of the inner controller 60 is homed to the first position to push the spring-like member 12a to depart from the transmission sleeve 12. At this time, the outer balls 24b are stilled located in the outer grooves 22b, such that the spring-like member 13a keeps contact with the transmission sleeve 13b.

Because the spring-like member 12a and the transmission sleeve 12b are in a separate state, the second input gear 12 is rotatable freely. Therefore, the turning power of the input shaft 80 brings the first output gear 31 and the second output gear 32 to turn through the first input gear 11, and the second input gear 12 is turned along with the second output gear 32. The transmission sleeve 13b brings the spring-like member 13a and the third input gear 13 to turn so as to turn the third output gear 33. As shown in FIG. 11, the speed of the output shaft 90 to drive the wheels is defined as the fourth speed or the fourth shift.

Typically, under the conditions of providing power transmission and speed switch, the vehicle transmission device is in view of the following designs:

1. Compared to the prior art, the structure of the vehicle transmission device is designed and configured especially. The vehicle transmission device comprises the transmission control mechanism 20 and the controllers 60, 65 to constitute a compound structure for multiple operation demands of the vehicle to advance, climb, and so on, to change its power transmission mode different from the prior art.

2. The structure design of the transmission control mechanism 20 of the vehicle transmission device cooperating with the push sleeves A and the bearings B of the controllers 60, 65 to move between the first and second positions is to improve the problems of the prior art which is large in size, consumes power, cannot advance the speed to influence the torsion and speed output. The present invention changes the power transmission mode which is different from the motion of the prior art.

The present invention provides an effective vehicle transmission device having a space mode different from the prior art and has great improvements.

The above embodiments are only used to illustrate the present invention, not intended to limit the scope thereof. Many modifications of the above embodiments can be made without departing from the spirit of the present invention.

What is claimed is:

1. A vehicle transmission device, comprising:
an input shaft connected with a power source;
an input gear set disposed on the input shaft and spring-like members disposed inside the input gear set;
an output gear set meshing with the input gear set; and
a transmission control mechanism disposed on the input shaft for the input gear set to transmit a power to the output gear set and an output shaft so as to output the power;
wherein the transmission control mechanism includes a rotatable transmission control disc, a turning disc which is turned along with the transmission control disc, and a restoring spring disposed between the transmission control disc and the turning disc, the restoring spring having two ends fixed on the transmission control disc and the turning disc respectively, the transmission control mechanism further comprising a ball cylinder, the ball cylinder being adapted to accommodate the inner and outer balls for the inner and outer balls to move inside the ball cylinder.

2. The vehicle transmission device as claimed in claim 1, wherein the input gear set includes a first input gear, a second input gear, and a third input gear; the first input gear being fixed on the input shaft, rendering the first input gear to be turned synchronously along with the input shaft; the second and third input gears cooperating with bearings being mounted on the input shaft; the spring-like members comprising a first spring-like member and a second spring-like member and the transmission sleeves comprising a first transmission sleeve and a second transmission sleeve; the first spring-like member and the first transmission sleeve being provided inside the second input gear, and the second spring-like member and the second transmission sleeve being provided inside the third input gear; the first spring-like member inside the second input gear being disposed around the input shaft, the first spring-like member having two ends, one end and the first transmission sleeve inside the second input gear forming a transmission mode when getting contact with each other, another end cooperating with a first retainer being fixed on the second input gear, rendering the first spring-like member and the second input gear to be turned synchronously; the first transmission sleeve inside the second input gear cooperating with a second retainer being fixed on the input shaft, rendering the first transmission sleeve and the input shaft to be turned synchronously; the second spring-like member inside the third input gear being disposed around the second input gear, the second spring-like member having two ends, one end and the second transmission sleeve inside the third input gear forming the transmission mode when getting contact with each other, another end cooperating with a third retainer being fixed on the third input gear, rendering the second spring-like member and the third input gear to be turned synchronously; and the second transmission sleeve inside the third input gear cooperating with a fourth retainer being fixed on the second input gear, rendering the second transmission sleeve and the second input gear to be turned synchronously.

3. The vehicle transmission device as claimed in claim 2, wherein controllers are provided between the first and second spring-like members inside the second and third input gears and the transmission control mechanism, the controllers being defined as an inner controller and an outer controller; the inner and outer controllers each having a push sleeve and a thrust bearing; one end of the push sleeve of the inner controller being in contact with the inner balls, another end of the push sleeve of the inner controller being connected with the thrust bearing, the thrust bearing being connected with the first spring-like member inside the second input gear; one end of the push sleeve of the outer controller being in contact with the outer balls, another end of the push sleeve of the outer controller being connected with the thrust bearing, the thrust bearing being connected with the second spring-like member inside the third input gear; the inner and outer controllers being movable between a first position and a second position for the push sleeves and the bearings to push the first and second spring-like members respectively when at the first position or not to push the first and second spring-like members when at the second position to control the transmission mode of the input shaft and the input gear set.

4. The vehicle transmission device as claimed in claim 3, wherein the output gear set includes a first output gear, a second output gear and a third output gear to mesh with the first input gear, the second input gear and third input gear, respectively; a one-way bearing being provided between the first and second output gears, another one-way bearing being provided between the second and third output gears, the first input gear, the second input gear and the third output gear allowing that only a lower-rank output gear can drive a higher-rank output gear; the third output gear being fixed on the output shaft, rendering the third output gear and the output shaft to be turned synchronously.

5. The vehicle transmission device as claimed in claim 2, wherein the output gear set includes a first output gear, a second output gear and a third output gear to mesh with the first input gear, the second input gear and third input gear, respectively; a one-way bearing being provided between the first and second output gears, another one-way bearing being provided between the second and third output gears, the first input gear, the second input gear and the third output gear allowing that only a lower-rank output gear can drive a higher-rank output gear; the third output gear being fixed on the output shaft, rendering the third output gear and the output shaft to be turned synchronously.

6. The vehicle transmission device as claimed in claim 2, wherein the turning disc is formed with inner grooves and outer grooves which are arranged in the direction from the center to the periphery of the turning disc, corresponding to the inner balls and the outer balls; partial portions of the inner grooves and the outer grooves being located at a same straight line.

7. The vehicle transmission device as claimed in claim 6, wherein left portions of the inner grooves and right portions of the outer grooves are located at the same straight line.

8. The vehicle transmission device as claimed in claim 6, wherein the turning disc is formed with three sets of inner and outer grooves which are spaced at an angle of 120 degrees; the ball cylinder being provided with three sets of balls corresponding to the inner and outer grooves of the turning disc.

9. The vehicle transmission device as claimed in claim 1, wherein the transmission control disc is controlled by a manual operation mode, the periphery of the transmission control disc being formed with a groove to retain a rope, the rope being able to bring the transmission control disc and the turning disc to turn.

10. The vehicle transmission device as claimed in claim 1, wherein the transmission control mechanism cooperates with an automobile transmission control motor, according to the rotational speed of the input shaft, to control the transmission control disc to bring the turning disc to turn.

11. The vehicle transmission device as claimed in claim 1, further comprising a stationary main shaft, the main shaft being adapted for installation of wheels, the output shaft cooperating with a bearing being mounted on the main shaft.

12. The vehicle transmission device as claimed in claim 1, wherein the turning disc is formed with inner grooves and outer grooves which are arranged in the direction from the center to the periphery of the turning disc, corresponding to the inner balls and the outer balls; partial portions of the inner grooves and the outer grooves being located at a same straight line.

13. The vehicle transmission device as claimed in claim 12, wherein left portions of the inner grooves and right portions of the outer grooves are located at the same straight line.

14. The vehicle transmission device as claimed in claim 12, wherein the turning disc is formed with three sets of inner and outer grooves which are spaced at an angle of 120 degrees; the ball cylinder being provided with three sets of balls corresponding to the inner and outer grooves of the turning disc.

15. The vehicle transmission device as claimed in claim 1, wherein the power source is one of a motor, an internal combustion engine and an engine.

\* \* \* \* \*